May 27, 1941.  C. W. HANSELL  2,243,702
FREQUENCY MONITOR AND DETECTOR
Filed May 19, 1939  3 Sheets-Sheet 1

INVENTOR.
CLARENCE W. HANSELL
BY H. S. Grover
ATTORNEY.

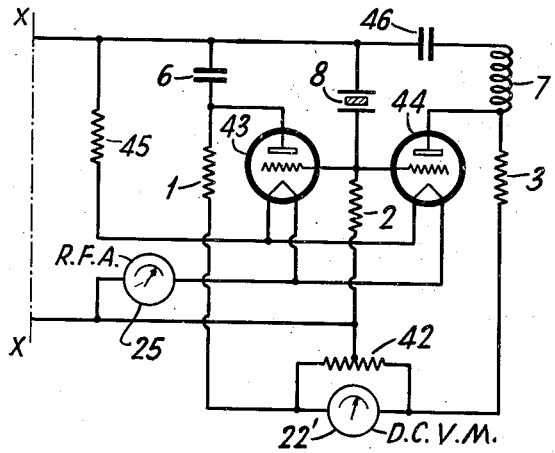
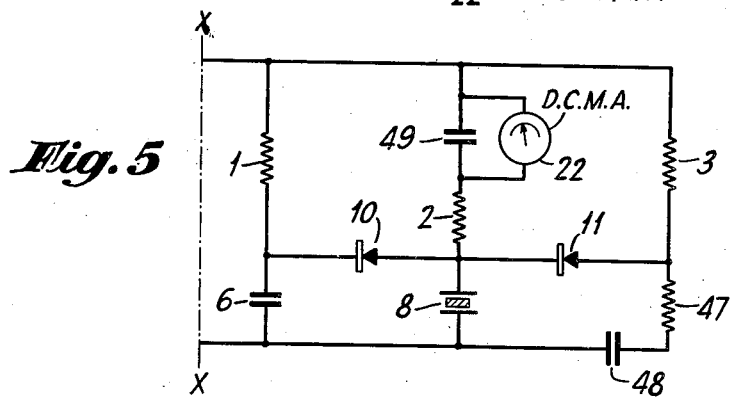
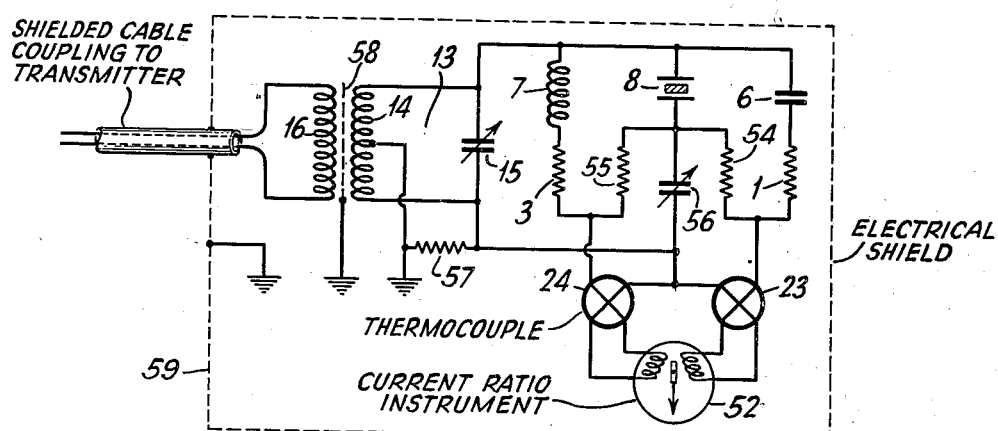

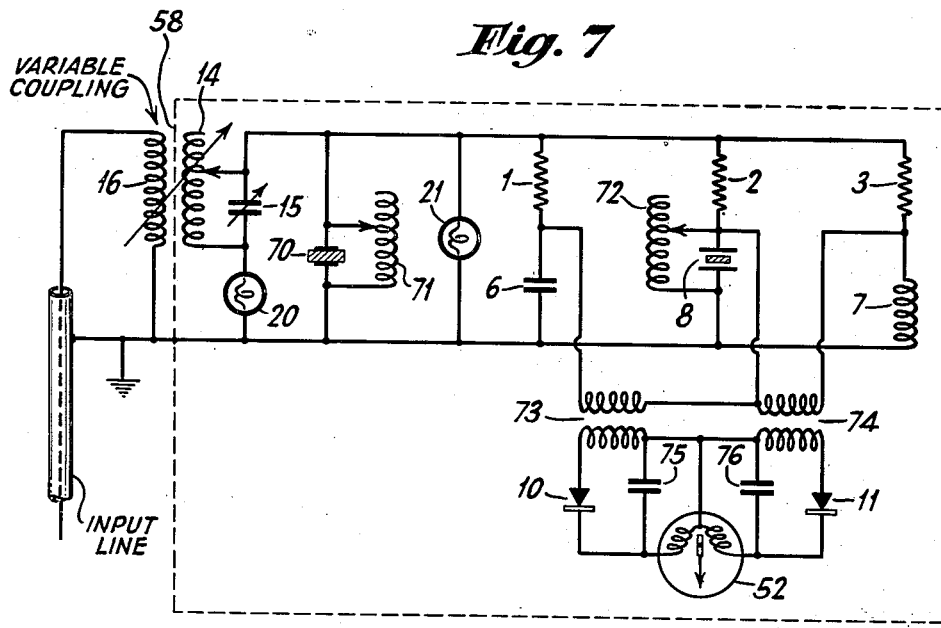

Patented May 27, 1941

2,243,702

UNITED STATES PATENT OFFICE 2,243,702

FREQUENCY MONITOR AND DETECTOR

Clarence W. Hansell, Rocky Point, N. Y., assignor to Radio Corporation of America, a corporation of Delaware Application May 19, 1939, Serial No. 274,601

7 Claims. (Cl. 250—39)

This invention relates to frequency monitors and, more particularly, to a means for detecting and measuring the departure of an alternating current wave from a predetermined periodicity.

An object of the present invention is to provide a new type of frequency monitor which eliminates any possibility of a false indicating point.

Another object of the invention is to provide a frequency monitor which is more simple in construction than frequency monitors heretofore known in the art.

Still another object of the present invention is to provide a frequency monitor having a low loss resonant circuit which may be adjusted to resonate at exactly the desired frequency of the source to be measured.

Another object of the present invention is the provision of a frequency monitor in which the indication of the instrument is nearly independent of the power level of the alternating current wave applied thereto.

Briefly, the present invention comprises a very constant sharply resonant circuit element through which a high frequency current flows with a phase relation with respect to an applied voltage which changes rapidly with a change in frequency of the voltage. Two portions of the current whose phase is sensitive to frequency are then combined with currents of the same frequency, the phase relations of which are less sensitive to frequency, to provide two resultant alternating currents which vary in magnitude differentially when the frequency of the currents is changed. Portions of the differentially variable alternating currents are then used to produce two differentially variable direct currents which, in turn, operate a suitable indicating instrument, such as a current ratio meter. The ratio of the direct currents, or reading of the meter, is then a measure of the frequency of the alternating currents in relation to the resonant frequency of the very constant sharply resonant circuit.

Figure 1:
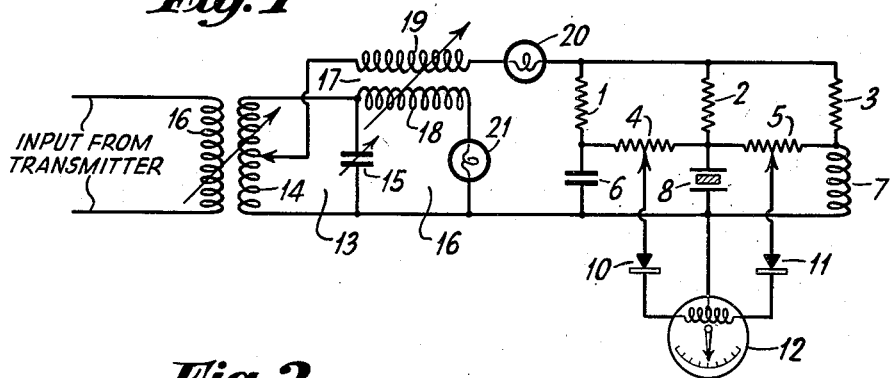
Figure 2:
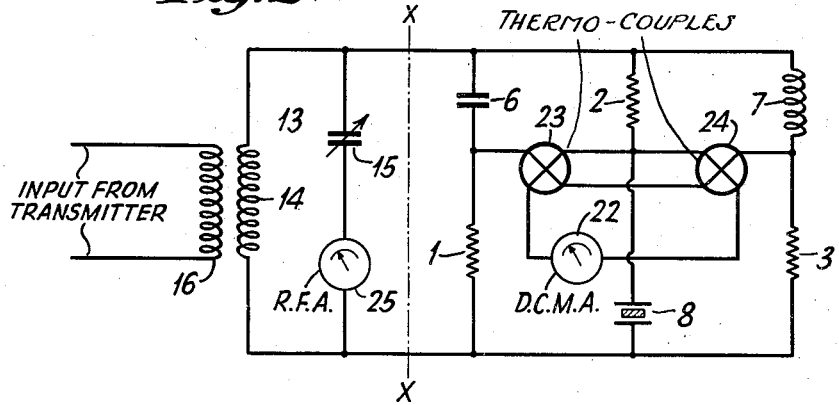
Figure 3:
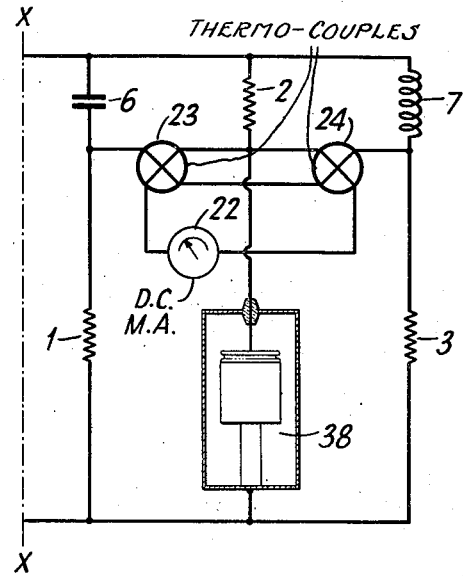

Reference will now be had, for a more complete understanding of the invention, to the following detailed description which is accompanied by drawings in which Figure 1 shows an embodiment of the present invention; Figure 2 shows a modification of the form of invention shown in Figure 1 in which thermo-couples are used instead of rectifiers; Figure 3 shows a further modification in which a resonant line is used for the frequency standard instead of a crystal; Figures 4 and 5 show further variations in the detecting circuit and Figures 6 and 7 show modifications of the invention in which current ratio instruments are used to determine the balance.

Referring, now, to Figure 1, reference numerals 1, 2 and 3 denote resistances which are connected in series respectively with condenser 6, piezo-electric crystal 8 and inductance 7. The frequency to be measured is applied across the circuit including these 3 branches in parallel. The impedance of resistance 1 and the impedance of condenser 6 are approximately equal at the operating frequency of the device. Likewise, resistance 3 and inductance 7 have approximately equal impedance values. Resistance 2 has an impedance about equal to the minimum impedance of crystal 8 at resonance. Due to the sharp resonance characteristics of a crystal, the current through crystal 8 rapidly changes in phase as the frequency of an impressed voltage is varied from above the resonant frequency of the crystal where its impedance is predominantly capacitive to below the resonant frequency of the crystal where its impedance is predominantly inductive, or vice versa. At the junction points between resistance 1 and condenser 6 and the junction point between resistance 3 and inductance 7 there will be little change in phase of the radio frequency voltage with reference to an assumed point of zero or earth potential, such as the lower connection between coil 7 and coil 14 as the impressed frequency is passed through the resonant region of the crystal. Furthermore, it should be noted these latter two junction points have voltages, with reference to the same level, substantially 90 degrees different in phase from each other and differing both in phase and amplitude from the voltage with respect to the same level at the junction between resistance 2 and crystal 8 when the impressed frequency is equal to the resonant frequency of the crystal. A variation in the applied frequency above and below the resonant frequency of the crystal causes differential variations in currents through resistances 4 and 5. Differentially varying voltages are therefore impressed on the two rectifiers 10 and 11. The rectifiers, therefore, cause differentially varying currents through the zero center reverse current meter 12 thus indicating in which direction the applied frequency is different from the resonant frequency of the crystal. If the applied radio frequency voltage or current to the system is held constant, the meter scale of differential meter 12 may be directly calibrated in cycles difference between the crystal resonant frequency and the applied frequency. If this is the case, the input voltage or current should, of course, always be adjusted by suitable means to the same predetermined value. A radio frequency measuring instrument or meter may be connected to the input in order that this may conveniently be done. One way in which this may be done is shown in Figure 2 and will be explained in more detail with reference to that figure.

In Figure 1 I have shown a somewhat different system for adjusting and holding correct calibration of the device. A tuned circuit 13 composed of inductance 14 and variable capacity 15 is shown for obtaining broad tuning to the applied frequency and for reducing the possibility of undesired harmonics or other frequencies causing a wrong indication. The output of the transmitter or other frequency source to be measured is applied to tuned circuit 13 by means of a coupling coil 16. The coupling relationship between coil 16 and coil 14 may be variable in order to vary the input as desired. A second coupling transformer 17 composed of inductance 19 and inductance 18 with a variable coupling relationship therebetween has inductance 19 connected between tuned circuit 13 and the indicating device previously described. In the connection therebetween is shown an incandescent lamp 20. The inductance 18 is connected across tuned circuit 13 with lamp 21 in series therewith. The lamps 20, 21 have tungsten filaments the resistance of which increases rapidly with an increase of current therethrough. For low inputs to tuned circuit 13 lamp 21 has a low resistance. For this condition coupling transformer 17 is adjusted to have a number of turns in the two windings and mutual coupling therebetween such that current through coil 18 tends to force maximum percentage increase in the current through coil 19. For higher inputs to tuned circuit 13 lamp 21 has a higher resistance due to greater current flow therethrough. As a result there is a much smaller percentage increase in the current through coil 18. Thus, variations in the resistance of lamp 21 tend to make the current in coil 19 vary less rapidly than the current in tuned circuit 13.

Likewise, lamp 20 increases its resistance with increasing current and so tends to allow less than proportional variation in the current through coil 19 to the indicating circuits. In some cases another lamp may be connected in series with the coil 14 of the tuned circuit 13 in order that variations in current in the circuit may vary the series resistance in a direction to reduce the current variations. Best results will be obtained when the lamps are designed to operate in a range of current which places their filament temperatures below the normal temperatures used for producing light. Thus, the whole system is made relatively unresponsive to variations in input energy insofar as readings of the differential meter are concerned. Other available lamps using other filament materials than tungsten may be used, including tantalum, iron wire, etc. I prefer tungsten lamps only because they are cheap and universally available. Of course, in any case the zero or exact frequency center of the instrument is unaffected by variation in input power level but the calibration for off frequency indications may be if no precautions are taken. Other means of rendering the device insensitive to input level variations will be discussed later.

In addition to the function of regulating the strength of currents to the indicating instrument the lamps 20, 21 may serve the purpose of indicating the correct input level to an operator who may adjust the coupling to the source of alternating current power. The lamps also indicate the presence or absence of input to the device and may likewise be used to light the scale of the differential meter 12.

In operation, if the input level is first made small and then slowly increased lamp 20 will light up brightest first and then lamp 21 will become brightest. The meter scale may be calibrated for a level where the two lamps are of equal brightness and then the operator may be instructed to adjust the input for this condition. The indicating device should preferably be calibrated with the thought that the device will be used under conditions where neither lamp is lighted to full brilliancy when they are equally illuminated. The reason for this is that the change in resistance in the lamps with a change in current is more rapid at the lower temperatures.

In addition to the use of the lamps, "Thyrite" resistors may be shunted across the circuits in order to increase the loading when the input from the transmitter is increased, or "Thyrite" resistors may be substituted for the lamps by using suitable circuits, such as shown in Figure 7 and described more fully with reference to that figure. "Thyrite" is a material developed by the General Electric Company for use in lightning arresters which automatically decreases its resistance at a rapid rate when the potential across it is increased.

Referring, now, to Figure 2 wherein elements having the same function as in Figure 1 are designated by the same reference numerals, it will be seen that the circuit is substantially equivalent to that shown in Figure 1, except that the tuned circuit 13 has a radio frequency ammeter in series therewith and the lamps 20, 21 and the transformer 17 are omitted.

The positions of the crystal 8 and resistor 2 are also reversed but this has no effect on the operation of the device except to reverse the direction of the direct currents supplied to the frequency indicating meter. This has no effect on the function of the device since the device may be adjusted or calibrated to take care of the reversal of the currents.

In operating the device shown in Figure 2, the coupling to the transmitter is so adjusted that the radio frequency ammeter 25 indicates the predetermined value at which the device is calibrated. The differentially varying currents between the junction points in the indicating portion of my device are applied to differential thermocouples 23 and 24. The output from the thermo-couples is read directly on a direct current milliammeter 22.

Except for the above pointed out distinctions, the operation of the circuit of Figure 2 is similar to that heretofore described with reference to Figure 1.

In Figure 3 I have shown a modification of the device shown in Figure 2 wherein a resonant line 38 is substituted for the crystal 8. The portion to the right of the dotted line X, X is to be assumed as substituted for the portion to the right of dotted line X, X in Figure 2. The resonant line assumes the function of the crystal in Figure 2, the operation being otherwise the same.

In Figure 4 I have shown a further modification of the embodiment shown in Figure 2 wherein vacuum tubes 43, 44 are substituted for the differential thermo-couples. In this arrangement the current required to be passed by the crystal is small compared to the currents through condenser 7 and inductance 8 so that the crystal does not limit the power level of the device.

The rectified output from tubes 43, 44 is applied across center tapped resistor 42 and the resultant voltage is read on direct current voltmeter 22'. Blocking condenser 46 is used to isolate crystal 8 from the plate circuit of tube 44. In order to make the device self-contained and obviate the use of batteries, the filaments of tubes 43 and 44 are connected across the input to the indicating device in series with a resistor 45 and a radio frequency ammeter 25. The device is calibrated so that when the meter 25 indicates a predetermined current flow through the filament circuit the filaments are properly energized and the correct power level input is applied to the measuring device.

It will be understood by those familiar with the art that the rectified direct current between anodes and cathodes of each of vacuum tubes 43 and 44 is a function of the amplitudes of high frequency potentials applied to both the anodes and control electrodes of the tubes and to the phase relations between them. Maximum direct currents flow when anodes and control electrodes are supplied with potentials in like phase, and minimum direct currents flow when they are supplied with potentials in opposite phase. In the functioning of the circuits of Figure 4, the phase relations of high frequency inputs to anodes and control electrodes of the two tubes 43, 44 are alike and give equal rectified currents at only one frequency which corresponds substantially to the resonant frequency of the crystal 8. If the frequency varies above or below this frequency value then the tubes deliver unequal direct currents with the direction of unbalance between currents dependent upon the direction of frequency change. The unbalance in currents causes instrument 22' to indicate one direction of current or the other depending upon the direction of frequency error. The magnitude of reading of the instrument above or below its zero value is a measure of the amount of frequency error.

The modification of my invention shown in Figure 5 utilizes a pair of rectifiers 10 and 11 substituted in the circuit for resistances 4 and 5 as was shown in Figure 1. In series with the crystal circuit, including crystal 8 and resistance 2, is placed the direct current milliammeter 22. In order to by-pass radio frequency energy around the milliammeter a condenser 49 is placed thereacross. Also in this modification a resistor 47 and a condenser 48 are substituted for inductance 7. As in the previously described modifications, a potential difference between the junction of resistor 1 and condenser 6 and resistor 2 and crystal 8 causes current to flow through the rectifier 10 causing meter 22 to deflect in one direction. If the frequency varies in the other direction from the previously assumed example, a potential difference will exist between the junction of resistors 3 and 47 and the junction between resistor 2 and crystal 8 causing a current flow through rectifier 11. The meter 22 is thereby deflected in the other direction. The impedance of condenser 48 and resistor 47 is substantially equal to the impedance of inductance 7 of the previous modifications at the resonant frequency of crystal 8. The phase shifts at the junction points between resistor 1 and condenser 6 and resistor 3 and resistor 47 are negligible compared with the phase shift at the junction point between resistor 2 and crystal 8 over the normal operating range of the device. The crystal works substantially like a series circuit of extremely small capacity, very large inductance and relatively low resistance so that it changes from an effective resistance at resonance to a predominantly effective inductance or capacity for a very small change in frequency.

In Figure 6 I have shown still another modification of my invention in which the current output from thermo-couples 23, 24 is applied to a current ratio instrument 52 instead of to a differential meter, as heretofore shown. The advantage of the use of the current ratio meter is that the meter responds only to relative differences in the currents to the two coils and not to any difference in their absolute levels. Therefore, the device shown in Figure 6 is not affected by variations in input level and adjustment thereof to a predetermined level is not necessary.

In the circuit shown in this figure the inductive branch is constituted by inductance 7, resistor 3 and thermo-couple 24 connected in series across the coil 14 and the capacitive branch by a condenser 6, resistor 1 and thermo-couple 23 also connected in series across coil 14. As in previously discussed modifications, the currents from these two branches are for the normal range of the instrument mutually in phase quadrature. The current in crystal 8 divides into two paths constituted by a resistor 55, thermocouple 24, a resistor 54 and thermo-couple 23. The division of currents through these two branches is equal and at the resonant frequency of the crystal their effects in the thermo-couples 23, 24 are also equal. On either side of the resonant frequency the crystal currents add to the current in the inductive or in the capacitive branch depending upon the direction of departure of the wave from the resonant frequency of the crystal thus unbalancing the meter 52. Resistors 54 and 55 are necessary to prevent the lower ends of resistors 1 and 3 from always having the same potential as the junction between crystal 8 and condenser 56.

As further refinements in Figure 6 I have shown a neutralizing condenser 56 for neutralizing the unavoidable circuit capacities in the measuring portion of the circuit, impedance 57 for balancing the input circuit and an electrostatic shield 58 between input coupling coil 16 and tuned circuit 13. If the flux generated by every portion of coil 14 interlinked with every other portion of coil 14, the balancing impedance 57 would not be necessary. However, since this is impossible the impedance 57 assures that the resistive load on both halves of coil 14 is maintained equal in spite of unavoidable circuit capacities from condenser 6, crystal 8 and inductance 7 to ground. Substitution of condenser 56 in place of resistance 2 shown in the other figures does not affect the functioning of the device except to make a very small shift in the frequency with respect to the resonant frequency of the crystal at which the instrument 52 reads zero frequency variation. This shift may be allowed for in adjusting the thickness of the crystal used in the device. It should be noted that the effective current through condenser 56 is varied in accordance with the shift of frequency from the predetermined value of the phase relation of the currents in the crystal and in the impedances 6 and 7. Furthermore, I have shown the device as entirely enclosed within an electrical shield 59 in order that the readings of the instrument 52 will not be affected by stray fields.

In the arrangement shown in Figure 7 the coupling to the source of high frequency power and the coupling to the measuring unit are adjusted until the two lamps 20, 21, which may be placed on each side of the current ratio instrument 52, have equal lightness. This assures correct current strengths for which the device may be calibrated.

When the coupling between coils 16 and 14 is made small and then increased the automatically variable resistance 70 has a high resistance value but its resistance decreases rapidly with increasing voltage across it. Consequently, lamp 21 lights up first and the other lamp 20 then lights up as the resistance of the automatically variable resistance decreases. At a definite value of input the lamps will light equally and this value may be taken as standard for purposes of calibration.

For assisting in overcoming couplings at harmonic and other spurious frequencies an electrostatic shield 58 may be provided between input coupling coils 16, 14. The circuit is also shown tunable by means of variable taps on the input coupling coil 14 and the variable condenser 15 in parallel with it.

The automatically variable resistance 70 may be a block of "Thyrite," a layer of cuprous oxide between metal plates, or any one of the other materials known to decrease resistance rapidly with increasing potential across it. Since the automatically variable resistance has dielectric capacity it is preferable to tune out this capacity for the approximate operating frequency by means of an adjustable parallel shunt 71.

Since the piezo-electric crystal 8 which serves as the frequency standard in the instrument, and its electrodes and mounting, also have dielectric capacity which is undesirable, I have shown means for tuning this capacity for the crystal resonant frequency with an adjustable parallel inductance 72.

In the arrangement shown in Figure 7 I have shown inductive coupling transformers 73, 74, the primaries of which are connected between the points in the circuit which change phase with changing frequency. The secondaries of transformers 73, 74 supply current to rectifiers 10, 11 for operating the indicating instrument 52. This inductive coupling transfers high frequency power but isolates the circuits for direct currents.

Any suitable type of high frequency rectifier may be used but, for simplicity, I may use two fixed and matched crystal detectors. Crystal detectors which will serve the purpose have been known in the radio art almost from its beginning.

Output currents from the two rectifiers are applied to a current ratio instrument 52, which may consist of a permanent magnet free to turn with respect to two stationary coils set at right angles. The magnet thus always takes a position corresponding to the ratio of currents in the two coils. A pointer attached to the magnet, combined with a suitable scale gives an indication which may be read directly in terms of frequency if a proper calibration has been made.

This arrangement has a wide scale in the region of a balance of currents, corresponding to the correct frequency, and a rapidly closing scale for increasingly unbalanced currents. This is a practical advantage in providing useful indications of relative frequency over a wide range of frequencies combined with ability to read and adjust relative frequencies very accurately to a correct value.

While I have shown and particularly described several modifications of my invention, it is to be distinctly understood that my invention is not limited thereto but may be varied within the scope of the invention.

For example, I may employ an amplifier and amplitude limiter for obtaining a fixed value of current to be applied to the frequency measuring device. Also, the currents to be combined and applied to the rectifiers in the device may be obtained from the resistors instead of the capacity, inductance and frequency responsive device.

Furthermore, utilization of the differentially variable currents is not limited to operation of an indicating instrument but, instead, or, in addition, may operate a relay to sound an alarm if the frequency of the current departs too far from a desired value, or to control automatic means for correcting the frequency of the source of current.

I claim:

1. A circuit as described including an input for an alternating current wave to be measured, a series circuit comprising a low resistance resonant element and a resistance connected thereto whereby phase of the current through said circuit with respect to an applied voltage varies sharply with variations in frequency, a pair of circuits also connected to said input and being characterized in that currents flowing therethrough differ substantially 90 degrees in phase over a substantial band of frequencies, a pair of detectors each having an input and an output, an input of each of said detectors being coupled to one of said pair of circuits and means for so supplying current to said detectors from the junction between said low resistance resonant element and said resistance that the current in each of said detectors is proportional to the vector difference of the current in its associated circuit and the current in said low resistance resonant element, and means for comparing the currents in said detector outputs.

2. A circuit as described including an input for an alternating current wave to be measured, means for adjusting the amplitude of said wave to a predetermined value, a series circuit comprising a low resistance resonant element and a resistance connected thereto whereby phase of the current through said circuit with respect to an applied voltage varies sharply with variations in frequency, a pair of circuits also connected to said input and being characterized in that currents flowing therethrough differ substantially 90 degrees in phase over a substantial range of frequencies, a pair of detectors each having an input and an output, an input of each of said detectors being coupled to one of said pair of circuits and means for so supplying current to said detectors from the junction between said low resistance resonant element and said resistance that the current in each of said detectors is proportional to the vector difference of the current in its associated circuit and the current in said low resistance resonant element, and means for comparing the currents in said detector outputs.

3. A circuit for measuring the variation of an applied alternating current wave from a predetermined frequency comprising three parallel branches, one of said branches including an element resonant to said frequency and a resistance connected in series, another of said branches including an inductance and a resistance in series and the third branch including a condenser and a resistance in series, a fourth and fifth resistance connecting the junction in said last two branches to the junction in said first branch and means for comparing the current in said fourth and fifth resistances.

4. A circuit for measuring the frequency of an alternating current wave applied thereto comprising three parallel branches, one of said branches including an element resonant to a predetermined frequency and a resistance connected in series, another of said branches including an inductive reactance and a resistance in series and the remaining branch including a capacitive reactance and a resistance in series and means for comparing the phase of the voltages at the junctions in said last named branches with the voltage at the junction in said first named branch, each of said voltages being taken with respect to a common reference point.

5. A circuit for measuring the frequency of an alternating current wave comprising three parallel branches, one of said branches including an element resonant to a predetermined frequency and a resistance connected in series, another of said branches including an inductive reactance and a resistance in series and the remaining branch including a capacitive reactance and a resistance in series and means for comparing the phase of the voltages at the junctions in said last named branches with the voltage at the junction in said first named branch, each of said voltages being taken with respect to a common reference point, means for applying an alternating current wave to said circuit and means for adjusting the amplitude of said wave to a predetermined value.

6. A circuit as described including an input for an alternating current wave to be measured, a series circuit comprising a piezo-electric crystal and a resistance connected thereto whereby phase of the current through said circuit with respect to an applied voltage varies sharply with variations in frequency, a pair of circuits also connected to said input and being characterized in that currents flowing therethrough differ substantially 90 degrees in phase over a substantial band of frequencies, a pair of detectors each having an input and an output, an input of each of said detectors being coupled to one of said pair of circuits and means for so supplying current to said detectors from the junction between said crystal and said resistance that the current in each of said detectors is proportional to the vector difference of the current in its associated circuit and the current in said crystal, and means for comparing the currents in said detector outputs.

7. A circuit as described including an input for an alternating current wave to be measured, a series circuit comprising a resonant line and a resistance connected thereto whereby phase of the current through said circuit with respect to an applied voltage varies sharply with variations in frequency, a pair of circuits also connected to said input and being characterized in that currents flowing therethrough differ substantially 90 degrees in phase over a substantial band of frequencies, a pair of detectors each having an input and an output, an input of each of said detectors being coupled to one of said pair of circuits and means for so supplying current to said detectors from the junction between said resonant line and said resistance that the current in each of said detectors is proportional to the vector difference of the current in its associated circuit and the current in said resonant line, and means for comparing the currents in said detector outputs.

CLARENCE W. HANSELL.